United States Patent
Ulander et al.

(10) Patent No.: US 10,371,508 B1
(45) Date of Patent: Aug. 6, 2019

(54) METHOD FOR ALIGNMENT OF PHASE-SENSITIVE TRACKING SYSTEMS USING VARIABLE DELAY OFFSETS

(71) Applicant: X Development LLC, Mountain View, CA (US)

(72) Inventors: Klaus Ulander, Livermore, CA (US); Howard Tran, San Ramon, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 15/945,217

(22) Filed: Apr. 4, 2018

(51) Int. Cl.
  *G01B 11/27* (2006.01)
  *H04B 10/112* (2013.01)
  *H04B 10/25* (2013.01)

(52) U.S. Cl.
  CPC .......... *G01B 11/272* (2013.01); *H04B 10/112* (2013.01); *H04B 10/25* (2013.01)

(58) Field of Classification Search
  CPC ...... G01C 3/08; G02B 23/02; G02B 17/0678; G02B 17/0808; G02B 17/0852; G02B 21/00; G02B 21/34; G02B 26/0833; G02B 26/101; G02B 27/0172; G02B 27/1006; G02B 7/182; G01B 11/002; G01B 11/16; G01J 1/0204; G01J 2005/0081; G01J 5/04; G01N 15/1425; G01N 15/1429; G01N 15/1434; G01N 15/147; G01N 15/1484; G01N 2015/1006; G01N 2021/0346; G01N 2021/6439; G01N 2021/6463; G01N 21/00; G01N 21/07; G01N 21/47; G01N 21/4788; G01N 21/55; G01N 21/645; G01N 21/6456; G01N 25/72; G01N 35/00069

See application file for complete search history.

(56) References Cited

U.S. PATENT DOCUMENTS

| | | | |
|---|---|---|---|
| 9,716,549 B2 | 7/2017 | Dickson et al. | |
| 2009/0323163 A1 | 12/2009 | Steinkraus, Jr. et al. | |
| 2012/0039599 A1 | 2/2012 | Von Schwake | |
| 2017/0054499 A1* | 2/2017 | Graves | H04B 10/11 |
| 2017/0346563 A1 | 11/2017 | Steinkraus et al. | |

* cited by examiner

*Primary Examiner* — Michael P Stafira
(74) *Attorney, Agent, or Firm* — Botos Churchill IP Law LLP

(57) ABSTRACT

Aspects of the disclosure provide for a method of aligning a tracking system of a communication device. The method includes receiving an optical beam at the communication device. A first beam portion is received at the tracking system, and a second beam portion is received at an optical fiber of the communication device. Using one or more processors, an first signal and an second signal is received from the tracking system. The one or more processors are also used to determine a phase difference related to the first signal and a second phase difference related to the second signal. An offset for the first signal and an offset for the second signal are determined based on the respective phase difference. The one or more processors then track the optical beam using the tracking system and the determined offsets.

20 Claims, 6 Drawing Sheets

300

400

METHOD FOR ALIGNMENT OF PHASE-SENSITIVE TRACKING SYSTEMS USING VARIABLE DELAY OFFSETS

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a method of aligning a tracking system of a communication device. The method includes receiving an optical beam at the communication device, where a first beam portion of the optical beam is received at the tracking system and a second beam portion of the optical beam is received at an optical fiber of the communication device. The method further includes using one or more processors to receive a first signal and a second signal from the tracking system, which are generated based on a position of the first beam portion received at the tracking system, determine a first phase difference based on a first phase of the first signal and a second phase difference based on a second phase of the second signal, and determine a first offset for the first signal based on the first phase difference and a second offset for the second signal based on the second phase difference to adjust a setpoint of the tracking system. In addition, the method includes tracking, by the one or more processors, the optical beam using the tracking system and the first and second offsets.

In one example, the setpoint of the tracking system is a target location at or near a center of a tracking sensor. The tracking system optionally includes a flat surface and the position of the first beam portion is on the flat surface of the tracking system. In another example, determining the first phase difference includes determining a difference between the first phase of the first signal and a third phase detected at a center of the tracking system, and determining the second phase difference includes determining a difference between the second phase of the second signal and a fourth phase detected at the center of the tracking system. Additionally or alternatively, the first offset for the first signal includes a first number that, when added to the azimuth signal, adjusts the setpoint of the tracking system closer to a center of the tracking system; and the second offset for the second signal includes a second number that, when added to the elevation signal, adjusts the setpoint of the tracking system closer to the center of the tracking system.

Other aspects of the disclosure provide for another method of aligning a tracking system of a communication device. The method includes receiving an optical beam at the communication device, where a first beam portion of the optical beam is received at the tracking system and a second beam portion of the optical beam is received at an optical fiber. The method further includes using one or more processors to determine an initial signal power of the second beam portion at an initial position of the second beam portion, then moving the optical beam in a plurality of directions from the initial position. Furthermore, the method includes using one or more processors to determine a plurality of fiber locations of the second beam portion where the second beam portion has a low threshold signal power. The low threshold signal power is lower than the initial signal power, and each fiber location of the plurality of fiber locations corresponds to a direction of the plurality of directions from the initial position. The method then includes using the one or more processors to determine a plurality of tracking locations of the first beam portion, where each tracking location of the plurality of tracking locations corresponding to a fiber location of the plurality of fiber locations, and determine one or more offsets using the plurality of tracking locations of the first beam portion. In addition, the method includes tracking, by the one or more processors, the optical beam using the tracking system and the one or more offsets.

In one example, determining the one or more offsets includes determining a midpoint between the plurality of tracking locations, and determining the one or more offsets to assign the determined midpoint as a zero of the tracking system. The tracking system optionally includes a position sensitive detector. Additionally or alternatively, moving the optical beam includes controlling a steering mirror of the communication device. In another example, moving the optical beam includes sending instructions to a remote communication device to cause the remote communication device to move the optical beam.

The one or more offsets optionally are one or more phase shifts for one or more signals generated at a tracking sensor of the tracking system by the first beam portion. In a further example, determining the one or more offsets includes receiving a first signal and a second signal from a tracking sensor of the tracking system, determining a first phase difference based on a first phase of the first signal and a second phase difference based on a second phase of the second signal, and determining the one or more offsets based on the first and second phase differences. In this example, the first signal is generated along a first axis of the tracking system, and the second signal is generated along a second axis perpendicular to the first axis when the first beam portion is positioned on the tracking sensor. Also in this example, determining the first phase difference optionally includes determining a difference between the first phase of the first signal and a third phase detected at a center of the tracking sensor, determining the second phase difference optionally includes determining a difference between the second phase of the second signal and a fourth phase detected at the center of the tracking sensor. In yet another example, the low threshold signal power is at least 10 decibels less than the initial signal power.

Further aspects of the disclosure provide for a method of aligning a first communication device with a second communication device. The method includes receiving an optical beam transmitted from the second communication device at an initial position on an optical fiber of the first communication device and using one or more processors to determine an initial signal power of the optical beam at the first communication device. In addition, the method includes moving the optical beam in a plurality of directions from the initial position, and using the one or more processors to determine a plurality of fiber locations where the optical beam has a low threshold signal power. The low threshold signal power is lower than the initial signal power, and each fiber location of the plurality of fiber locations corresponds to a direction of the plurality of directions from the initial position. The method then includes using the one or more processors to determine an adjustment of the second communication device based on the plurality of fiber locations and adjusting the second communication device based on the determined adjustment.

In one example, determining the adjustment of the second communication device includes determining a midpoint between the plurality of fiber locations, and determining the adjustment of the second communication device based on the determined midpoint of the plurality of fiber locations. The low threshold signal power is optionally at least 10 decibels less than the initial signal power.

The method optionally also includes, after adjusting the second communication device, receiving a second optical beam transmitted from the first communication device at a second initial position on a second optical fiber of the second communication device; determining, by the one or more processors, a second initial signal power of the second optical beam at the second communication device; moving the second optical beam in the plurality of directions from the second initial position; determining, by the one or more processors, a plurality of second fiber locations where the second optical beam has a second low threshold signal power, the second low threshold signal power being lower than the second initial signal power, each second fiber location of the plurality of second fiber locations corresponding to a direction of the plurality of directions from the second initial position; determining, by the one or more processors, a second adjustment of the first communication device based on the plurality of second fiber locations; and adjusting, by the one or more processors, the first communication device based on the determined second adjustment.

Further in this example, the method optionally also includes, after adjusting the first communication device, determining, by the one or more processors, an updated midpoint of the second communication device using an updated position of the second optical beam transmitted by the first communication device; determining, by the one or more processors, a third adjustment of the first communication device based on the updated midpoint of the second communication device; and adjusting, by the one or more processors, the first communication device based on the determined third adjustment. The method in this example also optionally includes, after adjusting the first communication device based on the third adjustment, determining, by the one or more processors, a second updated midpoint of the first communication device using a second updated position of the optical beam transmitted by the second communication device; determining, by the one or more processors, a fourth adjustment of the second communication device based on the second updated midpoint of the first communication device; and adjusting, by the one or more processors, the second communication device based on the determined fourth adjustment.

DETAILED DESCRIPTION

Overview

The technology relates to aligning tracking systems of communication terminals as well as aligning those communication terminals. The communication terminals may be geographically separate and may also form at least part of a network, such as a free space optical communication network. Each tracking sensor of the tracking systems may be aligned to an optical fiber to more accurately track an incoming signal and aim an outgoing signal. At a first communication device of a first communication terminal, an optical beam may be received and diverted to the tracking sensor and the optical fiber. A position of a first beam portion on the tracking sensor may be identified. When a second beam portion is received at the optical fiber and the position of the first beam portion is not at or near the center of the tracking sensor, the optical beam may be processed to electronically align the tracking sensor and the optical fiber.

The communication terminals may then be aligned after the tracking system of each communication terminal is aligned so that an optical beam transmitted from one communication terminal may be received at or near a center of the optical fiber of the other communication terminal. An update communication regarding the alignment of the first and second communication terminals may be transmitted optically by the first communication terminal to the second communication terminal. In response to receiving the update communication, the location and/or pointing direction of the second communication terminal may be adjusted. To further align the first and second communication terminals, the center of the optical fiber at the second communication terminal may also be determined, and the location and/or pointing direction of the first communication terminal may also be adjusted.

The features described herein may provide an optical communication system that is more accurately aligned and capable of tracking and adjusting alignment quickly. Furthermore, the alignment of the tracking sensor and the optical fiber of each communication terminal may be performed without adversely affecting the signal-to-noise ratio.

Example Systems

Figure 1:
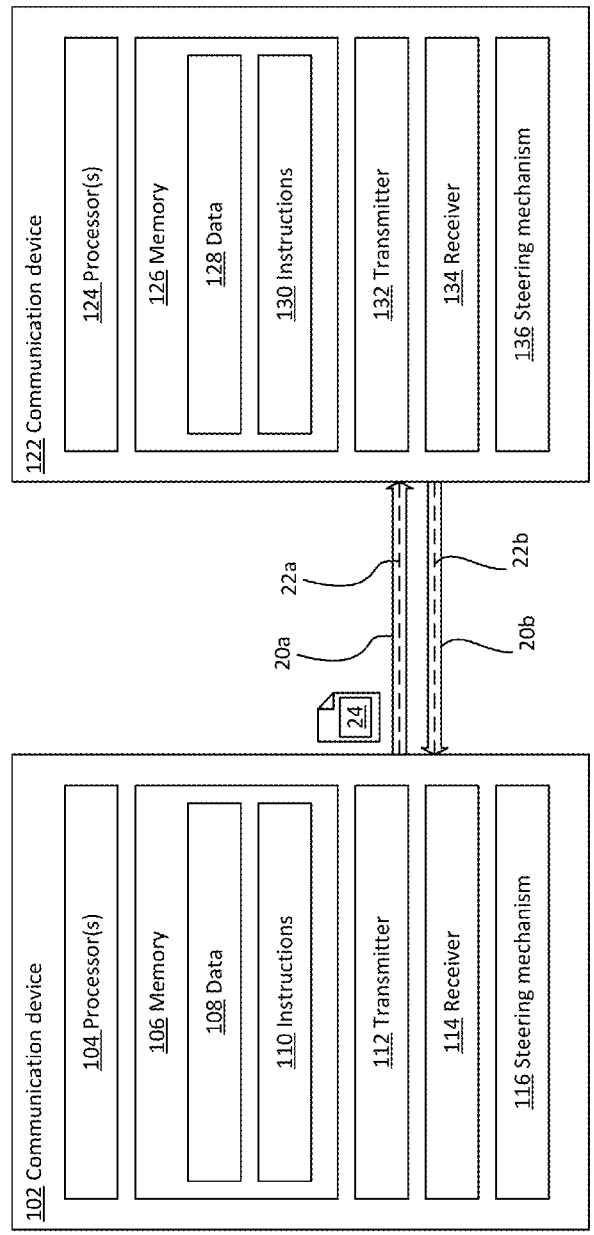
FIG. 1 is a block diagram 100 of a first communication device and a second communication device in accordance with aspects of the disclosure.

FIG. 1 is a block diagram 100 of a first communication device of a first communication terminal configured to form one or more links with a second communication device of a second communication terminal, for instance as part of a system such as a free-space optical communication (FSOC) system. For example, a first communication device 102 includes one or more processors 104, a memory 106, a transmitter 112, a receiver 114, and a steering mechanism 116.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information, such as one or more offsets determined for tracking a signal, may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transmitter 112 and the receiver 114. Transmitter 112 and receiver 114 may be part of a transceiver arrangement in the communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may be configured to output a beacon beam 20 that allows one communication device to locate another. The transmitter 112 may include a beacon transmitter which produces a beacon beam. The beacon beam may be output at a wider angle than the optical communication beam, allowing a communication device that receives the beacon beam to better locate the beacon beam. In other words, the beacon beam may cover a larger solid angle in space than the communication signal. For example, the beacon signal may cover an angular area on the order of a square milliradian, and the communication signal may cover an angular area on the order of a hundredth of a square milliradian.

The transmitter 112 may also be configured to transmit a communication signal over a communication link 22. In some examples, the communication signal may be a signal configured to travel through free space, such as, for example, a radio-frequency signal or optical signal. The transmitter 112 may include one or more communication link transmitters that are separate from the beacon transmitter. Alternatively, the transmitter 112 may include one transmitter configured to output both the beacon beam and the communication signal. In some implementations, a given communication link transmitter may include a semi-conductor device, such as, for example, a light-emitting diode (LED) or a laser diode. In some examples, the given communication link transmitter may include a fiber laser or a solid state laser. Laser diodes may be directly modulated, or in other words, the light output may be controlled by a current applied directly to the given communication link transmitter. The given communication link transmitter may include a single-mode laser diode that supports one optical mode, or the given communication link transmitter may include a multimode laser diode that supports multiple-transverse optical modes. The given communication link transmitter may receive a modulated communication signal from a modulator (not shown), which modulates a received electrical signal. The given communication link transmitter may then convert the modulated electrical signal into an optical communication beam that is configured to establish a communication link with another communication device, and then output the optical communication beam from the first communication device 102.

The transmitter 112 may also be configured to output a beacon beam 20 that allows one communication device to locate another. In some cases, the transmitter includes one or more communication link transmitters configured to transmit the optical communication beam and a separate beacon transmitter configured to transmit the beacon beam. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the otpical communication beam carrying a communication signal may cover an angular area on the order of a hundredth of a square milliradian.

The transmitter 112 of the first communication device 102 may be configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24. As such, when the second communication device 122 receives the beacon beam 20a, the second communication device 122 may establish a line-of-sight with the first communication device 102 or otherwise align with the first communication device. As a result, the communication link 22a that allows for the transmission of the optical communication beam (not shown) from the first communication device 102 to the second communication device 122 may be established.

The receiver 114 may include an optical fiber and a tracking system configured to detect the optical beam. The tracking system may include at least a tracking sensor. In addition, the tracking system may also include a lens, mirror, or other system configured to divert a portion of a received optical beam to the tracking sensor and allow the remaining portion of the received optical beam to couple with the optical fiber. For instance, a dichroic mirror or sample mirror may be included in the tracking system and may be configured to divert at or around 10% of the received optical beam to the tracking sensor. A remaining portion of the optical beam, such as at or around 90% of the optical beam, may continue on to the optical fiber. The tracking sensor may include a flat surface configured to detect a position of the optical beam on the flat surface. The tracking sensor may include, but is not limited to, a position sensitive detector (PSD), a charge-coupled device (CCD) camera, a focal plane array, a photodetector, a quad-cell, or a CMOS sensor. The tracking sensor may detect a signal location at the tracking sensor and may convert the received optical beam into an electric signal using the photoelectric effect. The tracking system may track the received optical beam, which may be used to direct the steering mechanism 116 to counteract disturbances due to scintillation and/or platform motion.

Furthermore, the one or more processors 104 may be in communication with the steering mechanism 116 (such as a mirror or a gimbal) for adjusting the pointing direction of the transmitter 112, receiver 114, and/or optical beam. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical beam in at least two degrees of freedom, such as, for example, yaw and pitch. The adjustments to the pointing direction may be made to establish acquisition and connection link, such as communication link 22, between the first communication device 102 and the second communication device 122. In addition, the adjustments may optimize transmission of light from the transmitter and/or reception of light at the receiver. In some implementations, the one or more processors 104 may provide closed loop control for the steering mechanism 116 to adjust pointing direction based upon the optical beam received over the communication link from a transmitting communication device, such as an optical beam received over the communication link 22b from the second communication device 122.

Similarly, the second communication device 122 includes one or more processors, 124, a memory 126, a transmitter 132, and a receiver 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes an optical fiber and a tracking system configured to detect the optical beam with the same or similar features as described above with respect to the receiver 114. In addition, the tracking system may also include a lens, mirror, or other system configured to divert a portion of a received optical beam to the tracking sensor and allow the remaining portion of the received optical beam to couple with the optical fiber. The tracking system of receiver 134 may track the received optical beam, which may be used to direct the steering mechanism 136 to counteract disturbances due to scintillation and/or platform motion.

The one or more processors 124 is in communication with the steering mechanism 136 (such as a mirror or a gimbal) for adjusting the pointing direction of the transmitter 132, receiver 134, and/or optical beam, as described above with respect to the steering mechanism 116. The adjustments to the pointing direction may be made to establish acquisition and connection link, such as communication link 22, between the first communication device 102 and the second communication device 122. In addition, the one or more processors 124 may provide closed loop control for the steering mechanism 136 to adjust pointing direction based upon the optical beam received over the communication link from a transmitting communication device, such as an optical beam received over the communication link 22a from the first communication device 102.

As shown in FIG. 1, the communication links 22a and 22b may be formed between the first communication device 102 and the second communication device 122 when the transmitters and receivers of the first and second communication devices are aligned. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 2:
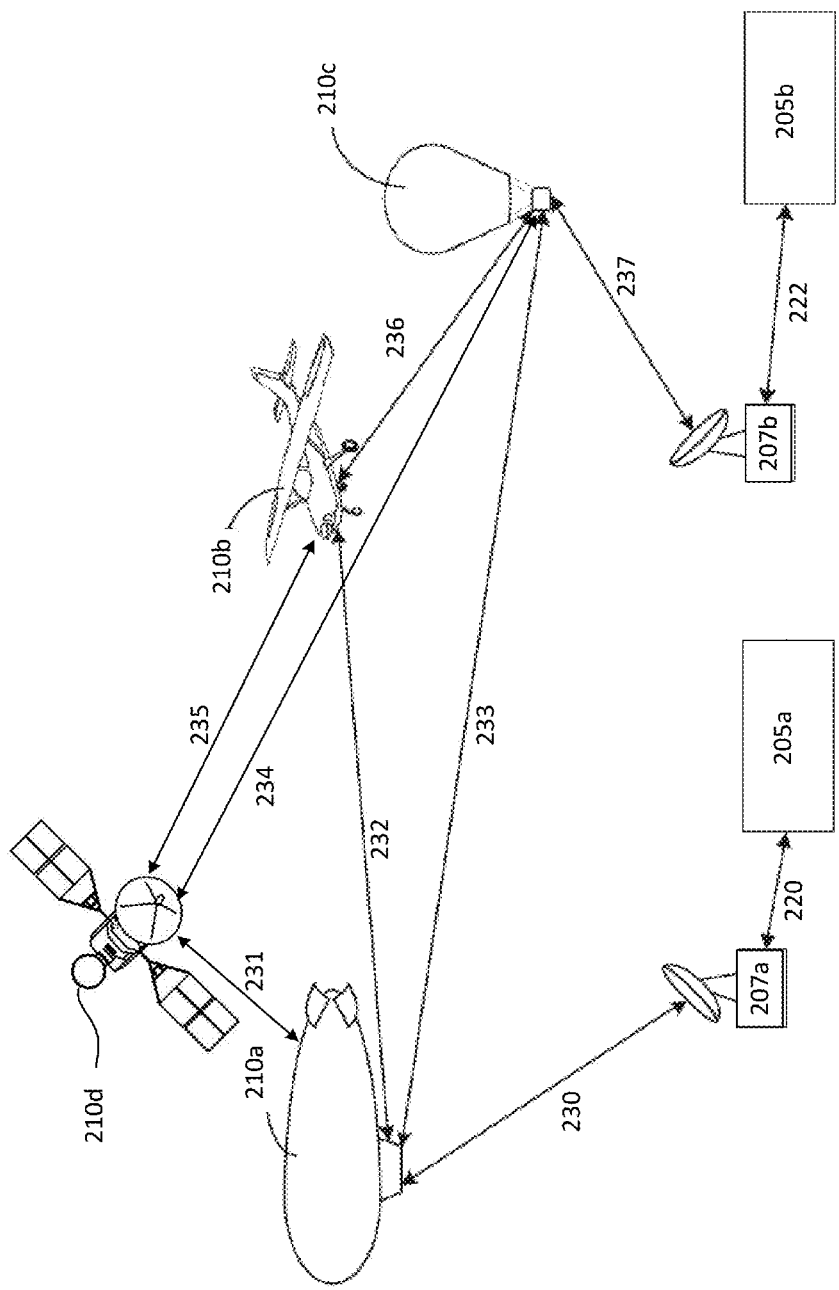
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links between a plurality of communication terminals and form a network 200. For example, the communication terminals in network 200 include two land-based datacenters 205a and 205b (generally referred to as datacenters 205), two ground terminals, or ground stations, 207a and 207b (generally referred to as ground stations 207), and four airborne high altitude platforms (HAPs) 210a-210d (generally referred to as HAPs 210). As shown, HAP 210a is a blimp, HAP 210b is an airplane, HAP 210c is a balloon, and HAP 210d is a satellite. Arrows shown between a pair of communication terminals represent possible communication links 220, 222, 230-237 between the communication terminals.

The network 200 as shown in FIG. 2 is illustrative only, and in some implementations the network 200 may include additional or different communication terminals. For example, in some implementations, the network 200 may include additional HAPs, which may be balloons, blimps, airplanes, unmanned aerial vehicles (UAVs), satellites, or any other form of high altitude platform, additional ground communication terminals, or other types of communication terminals. In alternate implementations, the network 200 is a terrestrial network comprising a plurality of communication devices on a plurality of ground communication terminals. The network 200 may be an FSOC network that includes communication terminals having communication devices equipped to perform FSOC, such as the first communication device 102 and the second communication device 122. In other implementations, the network 200 may additionally or alternatively be equipped to perform other forms of communication, such as radiofrequency communications.

In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network. In some implementations, HAPs 210 can include wireless transceivers associated with a cellular or other mobile network, such as eNodeB base stations or other wireless access points, such as WiMAX or UMTS access points. Together, HAPs 210 may form all or part of a wireless access network. HAPs 210 may connect to the datacenters 205, for example, via backbone network links or transit networks operated by third parties. The datacenters 205 may include servers hosting applications that are accessed by remote users as well as systems that monitor or control the components of the network 200. HAPs 210 may provide wireless access for the users, and may route user requests to the datacenters 205 and return responses to the users via the backbone network links.

Example Methods

The communication devices of geographically separate, or remote, communication terminals may be used to perform a method for aligning the tracking system and the optical fiber as well as aligning the communication devices to one another. At a first communication device, such as first communication device 102, an optical beam may be received and diverted to the tracking sensor and the optical fiber of the first communication device. The optical beam may carry an optical signal, such as a communication or beacon signal received from a second communication device, such as second communication device 122, or a test signal from another source used for calibrating the first communication device. In some instances, 10% or more or less of the optical beam may be diverted to the tracking sensor of the first communication device, while a second beam portion, such as the remaining portion of the optical beam, continues on to the optical fiber of the first communication device.

Figure 3:
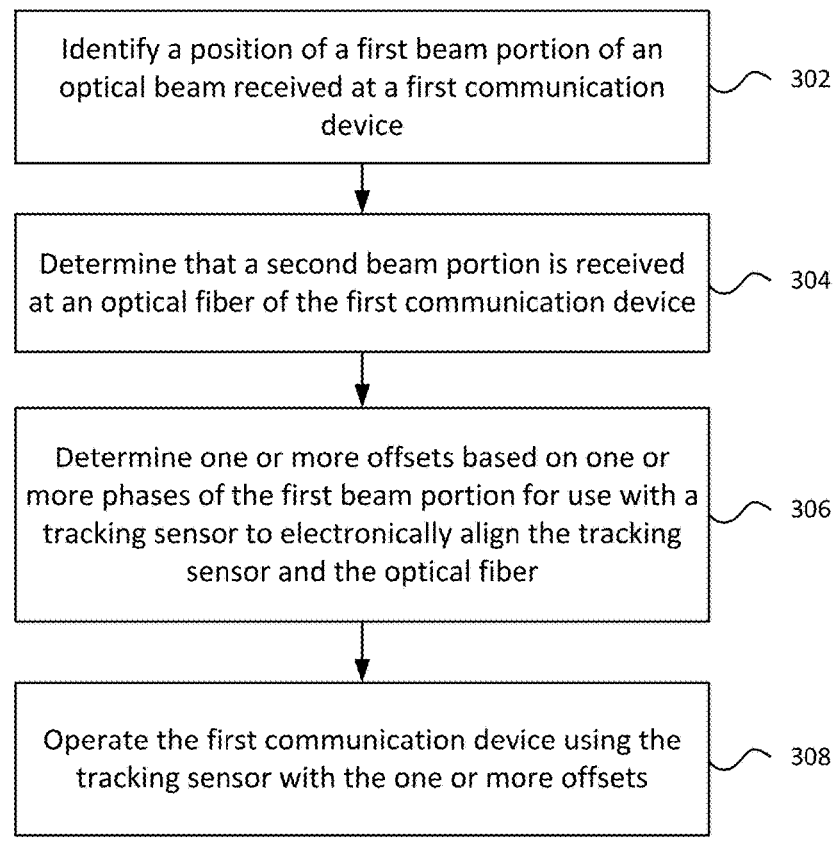
FIG. 3 is a flow diagram 300 in accordance with aspects of the disclosure.

In FIG. 3, flow diagram 300 is shown in accordance with some of the aspects described above that may be performed by the one or more processors 104 of the first communication device 102 and/or the one or more processors 124 of the second communication device 122. While FIG. 3 shows blocks in a particular order, the order may be varied and that multiple operations may be performed simultaneously. Also, operations may be added or omitted.

At block 302, one or more processors, such as one or more processors 104 of the first communication device 102, may identify a position of the first beam portion of the received optical beam. As an example, the position may be identified using a clock component in the tracking system that detects two time varying signals whose phase relative to the clock component measurements maps to position on the tracking sensor along a first and second perpendicular axes that extend in two directions, such as, a horizontal axis and a vertical axis. In particular, the clock component may measure phase of the two time varying signals at the center of the tracking sensor, such as by using a phase lock loop. The two time varying signals may be a first signal and a second signal, such as an azimuth (or horizontal) signal and an elevation (or vertical) signal. Other position identification methods may be used as well.

Figure 4:
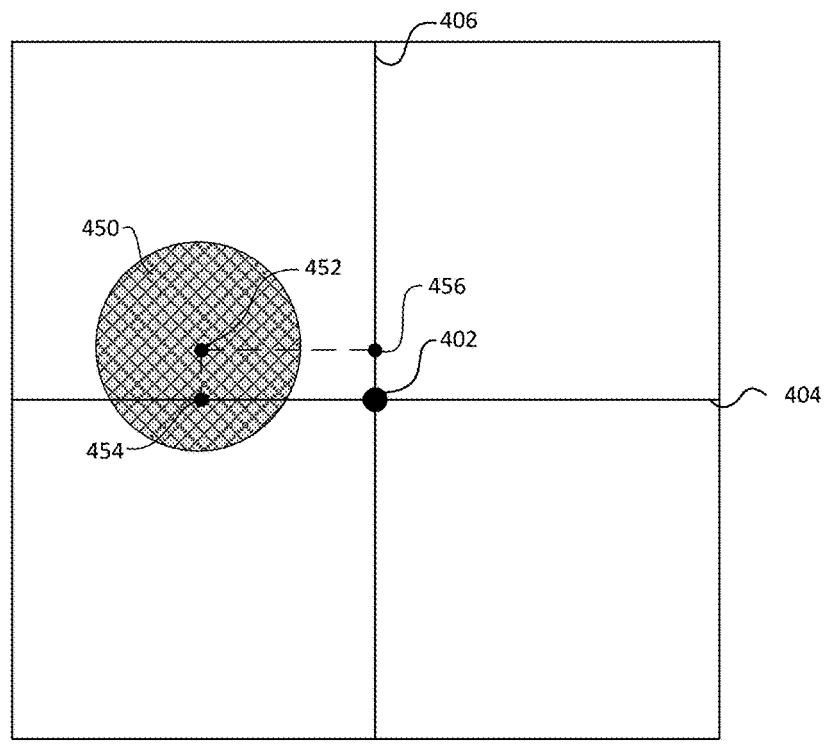
FIG. 4 is a pictorial diagram of a tracking sensor in accordance with aspects of the disclosure.

As shown in FIG. 4, the position of the first beam portion 450 may be identified relative to a center 402 of the tracking sensor 400 of the first communication device. For example, a first dimension midpoint 454 of the first beam portion 450 may be determined based on phase measurements along the first axis 404 that passes through the center 402 of the tracking sensor, and a second dimension midpoint 456 of the first beam portion 450 may be determined based on phase measurements along the second axis 406 that passes through the center 402 of the tracking sensor. The first dimension midpoint 454 and the second dimension midpoint 456 may be combined to identify the position of the first beam portion on the tracking sensor. For instance, the first dimension midpoint 454 may be determined as a distance from the center 402 of the tracking sensor along the first axis 404 and may be used as an x-coordinate for the center 452 of the first beam portion 450 received at the tracking sensor. The second dimension midpoint 456 may be determined as a distance from the center 402 of the tracking sensor along the second axis 406 and may be used as a y-coordinate for the center 452 of the first beam portion 450 received at the tracking sensor 400.

At block 304 of FIG. 3, the one or more processors may determine that the second beam portion is received at the optical fiber of the first communication device. A position sensor, such as a photodiode, at the optical fiber may detect when an optical beam is coupled with the optical fiber and send a signal to the one or more processors.

At block 306, the first beam portion may be processed to electronically align the tracking sensor and the optical fiber. In particular, one or more offsets may be determined for use with the tracking sensor that adjusts a setpoint, or target location, of the tracking sensor to be at or near the center of the tracking sensor when an optical beam is received at the optical fiber. For example, as the first beam portion is received at the tracking sensor, a first phase difference between the clock component phase measurements at the center of the tracking sensor and the phase of the first signal along the first axis may be determined. A first offset of the one or more offsets for the first signal may be determined based on the first phase difference. The first offset may be determined by converting the first phase difference to a number that is added to the first signal to effectively shift the first beam portion along the first axis on the tracking sensor to at or nearer to the center of the tracking sensor. Likewise, a second phase difference between the clock component phase measurements at the center of the tracking sensor and the phase of the second signal along the second axis may be determined as the first beam portion is received at the tracking sensor. A second offset of the one or more offsets may be determined based on the second phase difference. The second offset may be determined by converting the second phase difference to a number that is added to the second signal to effectively shift the position of the first beam portion along the second axis on the tracking sensor to at or nearer to the center of the tracking sensor. As a result of adding the offsets to the respective signals, the center of the tracking sensor may correspond more closely with a center of the optical fiber, and thus may electrically align the tracking sensor and the optical fiber.

At block 308, the one or more processors may operate the first communication device using the tracking system with the one or more offsets. Any optical beam portion received at the tracking sensor may be processed using the one or more offsets. Namely, the one or more offsets may be added to signals generated at the tracking sensor by a given optical beam portion in order to electronically shift the position of the given optical beam portion to a position more closely corresponding to position of a corresponding optical beam portion on the optical fiber. The one or more offsets may be stored in the memory of the first communication device, such as memory 106. The one or more processors may track any optical beam using the one or more offsets over time.

Figure 5:
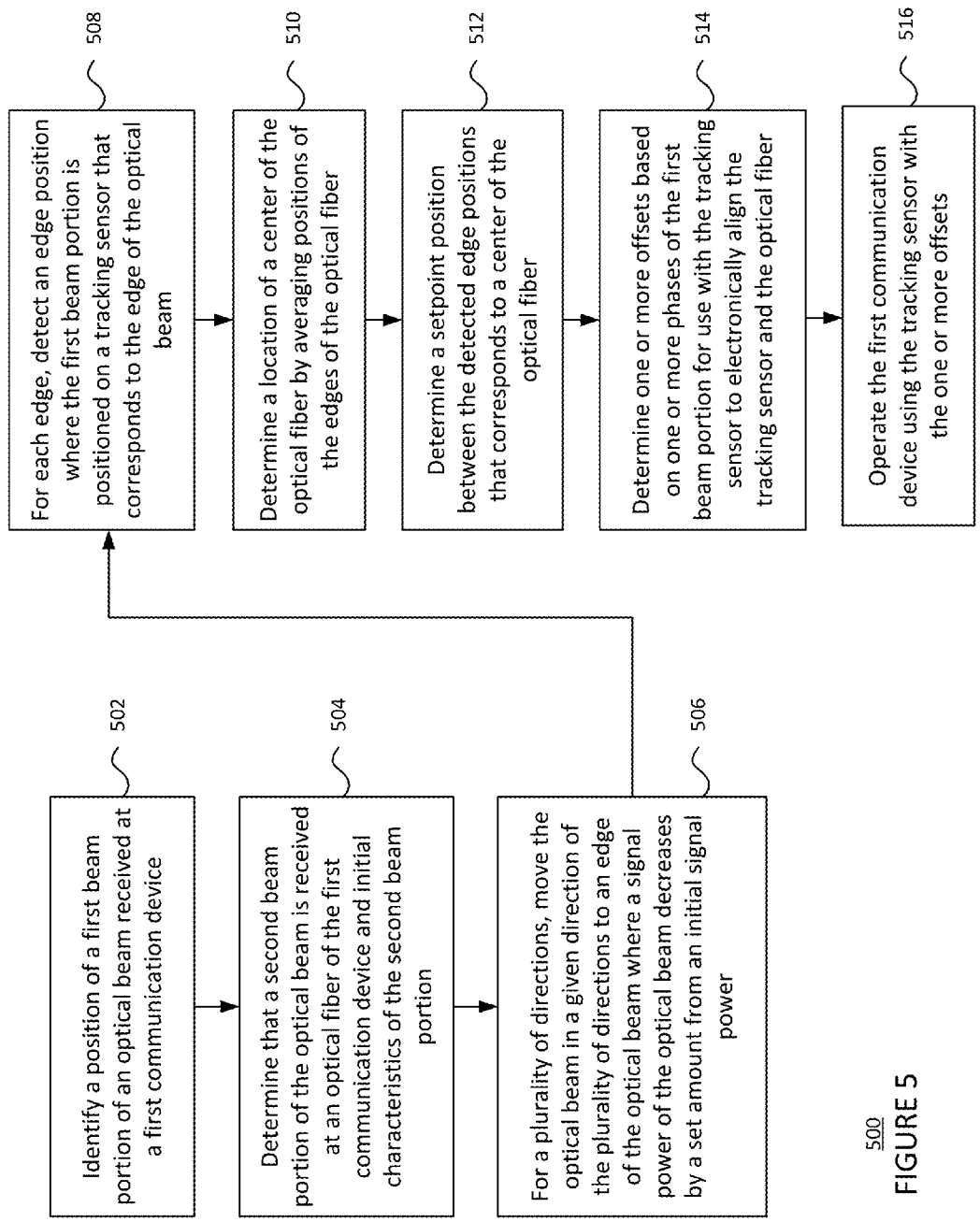
FIG. 5 is another flow diagram 500 in accordance with aspects of the disclosure.

Additionally or alternatively to the method outlined in FIG. 3, the one or more offsets may be determined or adjusted based on signal power received at the optical fiber as shown in FIG. 5. FIG. 5 provides a flow diagram 500 in accordance with some of the aspects described above that may be performed by the one or more processors 104 of the first communication device 102 and/or the one or more processors 124 of the second communication device 122. While FIG. 5 shows blocks in a particular order, the order may be varied and that multiple operations may be performed simultaneously. Also, operations may be added or omitted.

Figure 6:
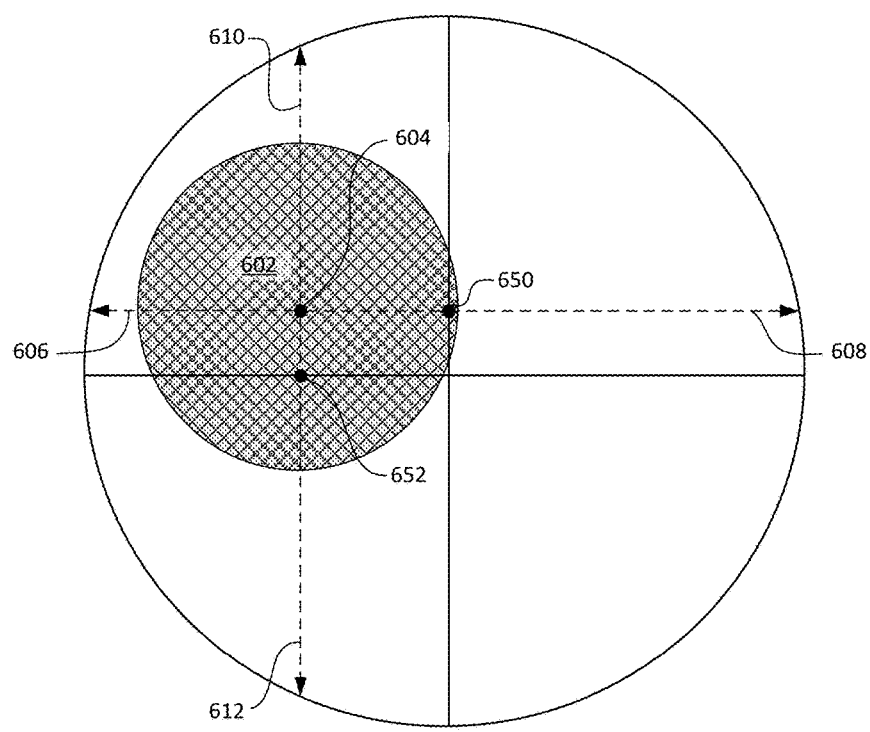
FIG. 6 is a pictorial diagram of an optical fiber 600 in accordance with aspects of the disclosure.

At block 502, one or more processors, such as one or more processors 104 of the first communication device 102, may identify a position of the first beam portion of the received optical beam in a same or similar manner as at block 302. At block 504, the one or more processors may determine that the second beam portion 602 is received at the optical fiber 600 of the first communication device in a same or similar manner as at block 304, as illustrated in FIG. 6, which shows the cross-section of optical fiber 600 receiving the second beam portion 602. The one or more processors may further determine initial characteristics of the second beam portion 602. The initial characteristics of the second beam portion may include an initial position of the second beam portion at the optical fiber based on measurements at the tracking sensor, such as centered at position 604, and an initial signal power of the second beam portion based on an amplitude of the second beam portion detected by the one or more processors via the tracking sensor.

At block 506, the optical beam may be moved such that the second beam portion moves towards a first edge in a first direction (i.e., leftward as shown by arrow 606 in FIG. 6) from the initial position 604, either by a second communication device transmitting the optical beam or using a steering mirror at the first communication device, until the signal power received at the optical fiber 600 from the second beam portion 602 decreases by a set threshold amount from the initial signal power. The set amount may be, for example, 10 decibels, or more or less. The fiber location where the signal power decreases by the set amount may be determined as the first edge of the optical fiber 600.

At block 508, a first edge position may be identified by the one or more processors as where the first beam portion is positioned on the tracking sensor of the first communication device when the second beam portion 602 is at the first edge of the optical fiber 600. Blocks 506 and 508 may be repeated for a second direction opposite the first direction, a third direction perpendicular to the first direction, and a fourth direction opposite the third direction, as well as any other additional directions, to determine second, third, fourth, or other edges of the optical fiber and corresponding edge positions on the tracking sensor. As shown in FIG. 6, the second direction may be rightward from the initial position 604, as shown by arrow 608; the third direction may be upward from the initial position 604, as shown by arrow 610; and the fourth direction may be downward from the initial position 604, as shown by arrow 612. In this example, a left, right, top, and bottom edge of the optical fiber may be determined, as well as a corresponding left, right, top, and bottom edge positions on the tracking sensor.

At block 510, a location of the center of the optical fiber 600 may be determined by averaging the position of the detected edges of the fibers. For example, the location of the optical fiber center may be determined by determining a first midpoint 650 between the first edge and the opposite second edge, determining a second midpoint 652 between the third edge and the opposite fourth edge, and averaging the first and second midpoints. In other implementations, the horizontal component of the first midpoint 650 and the vertical component of the second midpoint 652 may be used as x- and y-coordinates to identify the location of the optical fiber center.

At block 512, a setpoint position between the detected edge positions on the tracking sensor may be determined and set as corresponding to a center of the optical fiber. For example, the setpoint position may be determined by determining a first midpoint between the first edge position and the opposite second edge position, determining a second midpoint between the third edge position and the opposite fourth edge position, and averaging the first and second midpoints. In other implementations, the horizontal component of the first midpoint and the vertical component of the second midpoint may be used as x- and y-coordinates to determine the setpoint position.

At block 514, one or more offsets may be determined to electronically align the tracking system by adjusting the setpoint position to be closer to the center of the tracking sensor. For example, the first beam portion may be positioned at the setpoint position and a first offset and a second offset may be determined based on a first phase difference and a second phase difference, respectively, in a same or similar manner as described in block 306. Alternatively, a positional difference between the setpoint position and the center of the tracking sensor may be determined, and the first and second offsets may be calculated based on the positional difference. The first offset may be, for example, a number that is added to the first signal to effectively shift the position of the first beam portion on the tracking sensor to at or nearer to the center of the tracking sensor or other setpoint of the tracking sensor. Likewise, the second offset may be, for example, a number that is added to the second signal to effectively shift the position of the first beam portion on the tracking sensor to at or nearer to the center of the tracking sensor or other setpoint of the tracking sensor. As a result, the center of the tracking sensor may correspond more closely with a center of the optical fiber.

At block 516, the one or more processors may operate the first communication device using the tracking system with the one or more offsets. Any optical beam portion received at the tracking sensor may be processed using the one or more offsets. Namely, the one or more offsets may be added to signals generated at the tracking sensor by a given optical beam portion in order to electronically shift the position of the given optical beam portion to a position more closely corresponding to position of a corresponding optical beam portion on the optical fiber. The one or more processors may track the position of any optical beam using the one or more offsets over time.

Operating the first communication device may also include transmitting an update communication regarding the alignment between the first and second communication terminals to a second communication device, such as second communication device 122. The update communication may include a location of the center of the optical fiber of the first communication device or an adjustment to the second communication device based on a difference between a current signal location and the location of the center of the optical fiber. The update communication may cause the location and/or pointing direction of the second communication device to be adjusted to point the signal transmitted from the second communication device towards the location of the optical fiber center at the first communication device. For example, the steering mechanism of the second communication device, such as the steering mechanism 136 of second communication device 122, may be used to point the transmitter of the second communication device towards the location of the optical fiber center of the first communication device.

In addition, to further align the first and second communication devices, the location of the optical fiber center at the second communication device may be determined as described above in block 510. The location of the optical fiber center may be transmitted to the first communication device. The location and/or pointing direction of the first communication device may then be adjusted based on the location of the optical fiber center at the second communication device. In some implementations, the alignment method further includes determining an updated location of the center of the optical fiber of the second communication device, and performing a second adjustment of the first communication device based on the updated location. The alignment method may also include determining an updated location of the center of the optical fiber of the first communication device, and performing a second adjustment of the second communication device. With this additional iteration of determining the location of the center of the optical fiber, the alignment of the first and second communication terminals may be improved.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of aligning a tracking system of a communication device, the method comprising:
   receiving an optical beam at the communication device, a first beam portion of the optical beam being received at the tracking system and a second beam portion of the optical beam being received at an optical fiber of the communication device;
   receiving, by one or more processors, a first signal and a second signal from the tracking system, the first and second signals being generated based on a position of the first beam portion received at the tracking system;
   determining, by the one or more processors, a first phase difference based on a first phase of the first signal and a second phase difference based on a second phase of the second signal;
   determining, by the one or more processors, a first offset for the first signal based on the first phase difference and a second offset for the second signal based on the second phase difference to adjust a setpoint of the tracking system; and
   tracking, by the one or more processors, the optical beam using the tracking system and the first and second offsets.

2. The method of claim 1, wherein the setpoint of the tracking system is a target location at or near a center of a tracking sensor.

3. The method of claim 1, wherein the tracking system includes a flat surface and the position of the first beam portion is on the flat surface of the tracking system.

4. The method of claim 1, wherein:
   determining the first phase difference includes determining a difference between the first phase of the first signal and a third phase detected at a center of the tracking system; and
   determining the second phase difference includes determining a difference between the second phase of the second signal and a fourth phase detected at the center of the tracking system.

5. The method of claim 1, wherein the first offset for the first signal includes a first number that, when added to the first signal, adjusts the setpoint of the tracking system closer to a center of the tracking system; and
   the second offset for the second signal includes a second number that, when added to the second signal, adjusts the setpoint of the tracking system closer to the center of the tracking system.

6. A method of aligning a tracking system of a communication device, the method comprising:
   receiving an optical beam at the communication device, a first beam portion of the optical beam being received at the tracking system and a second beam portion of the optical beam being received at an optical fiber;
   determining, by one or more processors, an initial signal power of the second beam portion at an initial position of the second beam portion;
   moving the optical beam in a plurality of directions from the initial position;
   determining, by the one or more processors, a plurality of fiber locations of the second beam portion where the second beam portion has a low threshold signal power, the low threshold signal power being lower than the initial signal power, each fiber location of the plurality of fiber locations corresponding to a direction of the plurality of directions from the initial position;

determining, by the one or more processors, a plurality of tracking locations of the first beam portion, each tracking location of the plurality of tracking locations corresponding to a fiber location of the plurality of fiber locations;

determining, by the one or more processors, one or more offsets using the plurality of tracking locations of the first beam portion; and tracking, by the one or more processors, the optical beam using the tracking system and the one or more offsets.

7. The method of claim 6, wherein determining the one or more offsets includes:

determining a midpoint between the plurality of tracking locations, and determining the one or more offsets to assign the determined midpoint as a zero of the tracking system.

8. The method of claim 6, wherein the tracking system includes a position sensitive detector.

9. The method of claim 6, wherein moving the optical beam includes controlling a steering mirror of the communication device.

10. The method of claim 6, wherein moving the optical beam includes sending instructions to a remote communication device to cause the remote communication device to move the optical beam.

11. The method of claim 6, wherein the one or more offsets are one or more phase shifts for one or more signals generated at a tracking sensor of the tracking system by the first beam portion.

12. The method of claim 6, wherein determining the one or more offsets includes:

receiving a first signal and a second signal from a tracking sensor of the tracking system, the first signal being generated along a first axis of the tracking system and the second signal being generated along a second axis perpendicular to the first axis when the first beam portion is positioned on the tracking sensor;

determining a first phase difference based on a first phase of the first signal and a second phase difference based on a second phase of the second signal; and determining the one or more offsets based on the first and second phase differences.

13. The method of claim 12, wherein:

determining the first phase difference includes determining a difference between the first phase of the first signal and a third phase detected at a center of the tracking sensor; and determining the second phase difference includes determining a difference between the second phase of the second signal and a fourth phase detected at the center of the tracking sensor.

14. The method of claim 6, wherein the low threshold signal power is at least 10 decibels less than the initial signal power.

15. A method of aligning a first communication device with a second communication device, the method comprising:

receiving an optical beam transmitted from the second communication device at an initial position on an optical fiber of the first communication device;

determining, by one or more processors, an initial signal power of the optical beam at the first communication device;

moving the optical beam in a plurality of directions from the initial position;

determining, by the one or more processors, a plurality of fiber locations where the optical beam has a low threshold signal power, the low threshold signal power being lower than the initial signal power, each fiber location of the plurality of fiber locations corresponding to a direction of the plurality of directions from the initial position;

determining, by the one or more processors, an adjustment of the second communication device based on the plurality of fiber locations; and adjusting, by the one or more processors, the second communication device based on the determined adjustment.

16. The method of claim 15, wherein determining the adjustment of the second communication device includes:

determining a midpoint between the plurality of fiber locations, and determining the adjustment of the second communication device based on the determined midpoint of the plurality of fiber locations.

17. The method of claim 15, wherein the low threshold signal power is at least 10 decibels less than the initial signal power.

18. The method of claim 15, further comprising:

after adjusting the second communication device, receiving a second optical beam transmitted from the first communication device at a second initial position on a second optical fiber of the second communication device;

determining, by the one or more processors, a second initial signal power of the second optical beam at the second communication device;

moving the second optical beam in the plurality of directions from the second initial position;

determining, by the one or more processors, a plurality of second fiber locations where the second optical beam has a second low threshold signal power, the second low threshold signal power being lower than the second initial signal power, each second fiber location of the plurality of second fiber locations corresponding to a direction of the plurality of directions from the second initial position;

determining, by the one or more processors, a second adjustment of the first communication device based on the plurality of second fiber locations; and adjusting, by the one or more processors, the first communication device based on the determined second adjustment.

19. The method of claim 18, further comprising:

after adjusting the first communication device, determining, by the one or more processors, an updated midpoint of the second communication device using an updated position of the second optical beam transmitted by the first communication device;

determining, by the one or more processors, a third adjustment of the first communication device based on the updated midpoint of the second communication device; and adjusting, by the one or more processors, the first communication device based on the determined third adjustment.

20. The method of claim 19, further comprising:

after adjusting the first communication device based on the third adjustment, determining, by the one or more processors, a second updated midpoint of the first communication device using a second updated position of the optical beam transmitted by the second communication device;

determining, by the one or more processors, a fourth adjustment of the second communication device based on the second updated midpoint of the first communication device; and adjusting, by the one or more processors, the second communication device based on the determined fourth adjustment.

* * * * *